United States Patent [19]

Murakami et al.

[11] Patent Number: 5,075,275

[45] Date of Patent: Dec. 24, 1991

[54] CATALYST FOR PURIFICATION OF EXHAUST GASES

[75] Inventors: Hiroshi Murakami; Kazuko Yamagata; Kazunori Ihara, all of Hiroshima, Japan

[73] Assignee: Mazda Motor Corporation, Hiroshima, Japan

[21] Appl. No.: 548,707

[22] Filed: Jul. 6, 1990

[30] Foreign Application Priority Data

Jul. 6, 1989 [JP] Japan .................. 1-174819
Mar. 28, 1990 [JP] Japan .................. 2-76731

[51] Int. Cl.$^5$ .................. B01J 21/04; B01J 23/10; B01J 23/58
[52] U.S. Cl. .................. 502/303; 502/304; 423/213.5
[58] Field of Search .................. 502/303, 304; 423/213.5

[56] References Cited

U.S. PATENT DOCUMENTS

| | | | |
|---|---|---|---|
| 4,539,311 | 9/1985 | Harrison et al. | 502/304 |
| 4,581,343 | 4/1986 | Blanchard et al. | 502/304 X |
| 4,624,940 | 11/1986 | Wan et al. | 502/303 X |
| 4,782,038 | 11/1988 | Gandai et al. | 502/304 |
| 4,843,056 | 6/1989 | Matsumoto et al. | 502/304 X |
| 4,965,243 | 10/1990 | Yamada et al. | 502/304 |

FOREIGN PATENT DOCUMENTS

| | | | |
|---|---|---|---|
| 0251708 | 1/1988 | European Pat. Off. | 502/304 |
| 60-200021 | 10/1985 | Japan | 502/304 |

*Primary Examiner*—W. J. Shine
*Attorney, Agent, or Firm*—Fish & Richardson

[57] ABSTRACT

A catalyst is comprised of a catalyst carrier and a coat layer containing cerium particles, active alumina particles and a catalyst component of a noble metal; and barium barium oxide is immobilized on the cerium oxide particles. The catalyst can suppress the growth of crystals of cerium oxide due to the immobilization of the barium oxide thereon, thereby improving heat resistance of the catalyst.

13 Claims, 9 Drawing Sheets

5,075,275

CATALYST FOR PURIFICATION OF EXHAUST GASES

BACKGROUND OF THE INVENTION

1. Field of the Invention

The present invention relates to a catalyst for the purification of exhaust gases and, more particularly, to a catalyst mounted to an exhaust system for purifying exhaust gases by adsorbing hazardous components thereof.

2. Description of Related Art

Exhaust gases from vehicles are purified by removing their hazardous and noxious components such as NOx, CO and so on by, for example, ternary catalysts which may be disposed in the exhaust system.

U.S. Pat. No. 4,888,320 discloses a catalyst composed of a catalyst carrier with two coats deposited thereon. Specifically, a first coat is deposited on a surface of the catalyst carrier and a second coat is further deposited on a surface of the first coat and, more specifically, the first coat is comprised of alumina and the second coat is comprised of alumina containing cerium oxide $CeO_2$, platinum Pt and rhodium Rh. As the second coat is formed on the alumina layer as the first coat, the second coat containing a catalyst constituent such as platinum can be made uniform in coat thickness, preventing the catalyst component from sintering.

Japanese Patent Unexamined Publication (kokai) No. 113,487/1975 discloses a catalyst for the purification of exhaust gases in which a platinum group metal is deposited on the coat layer formed on the catalyst carrier comprised of active alumina by preparing a slurry solution containing at least one of chromium and tungsten and at least one of calcium, strontium, barium, silicon, tin and zirconium and coating the slurry solution on the surface of the carrier.

Japanese Patent Unexamined Publication (kokai) No. 71,536/1987 discloses a catalyst consisting of a first coat layer comprised of alumina containing platinum and rhodium and a second coat layer, which is formed on the first coat layer, containing cerium oxide and palladium.

Further, Japanese Patent Examined Publication (kokoku) No. 14,338/1987 discloses technology of forming a coat on the surface of a catalyst carrier by preparing a slurry from a mixture of an active alumina with at least one of cerium, zirconium, iron and nickel and at least one of platinum, palladium and rhodium, coating the slurry on the surface of the carrier to form a wash coat as well as drying and calcining the wash coat.

It is to be noted that the coat with cerium oxide contained therein can exhibit the effect of storing oxygen due to the cerium oxide. This effect of storing oxygen is such that, when the concentration of oxygen is high, namely, when the air/fuel ratio is on the lean side, the oxygen is adsorbed while, when the concentration of oxygen is low, namely, when the air/fuel ratio is on the rich side, the oxygen is discharged, thereby contributing to the catalytic reaction of the catalyst. Therefore, due to the catalytic effect of storing oxygen to be achieved by the cerium oxide contained in the catalyst, the catalyst has an extended region of the air/fuel ratio in which the catalyst can react with nitrogen oxides (NOx), hydrocarbons (HC) and so on. Hence, cerium oxide contributes to improvements in catalytic performance. It is also known that cerium oxide itself can react with water to cause a reaction with hydrogen gas, thereby serving as improvements in catalytic performance. Cerium oxide, however, may have the tendency that its crystal grows and its crystalline structure is rendered so large that a specific surface area of the cerium oxide becomes small. A smaller specific surface area of the cerium oxide results in a reduction in the catalytic effect of storing oxygen and in the reaction with hydrogen gas. Such a tendency that cerium oxide contained in the catalyst causes heat deterioration on account of the crystal growth due to a high-temperature heat applied to the catalyst from exhaust gases suffers from the difficulty to stabilize the catalytic activity of the catalyst with the cerium oxide contained therein at low temperatures.

SUMMARY OF THE INVENTION

The present invention has been performed in the situation as described hereinabove and under such conditions where the engine output power becomes high and great improvements have been achieved in fuel and emission performance, thereby causing exhaust gases to become higher in temperature.

Therefore, the present invention has the object to provide a catalyst for the purification of exhaust gases with improved heat resistance, adaptable to withstand heat deterioration of cerium oxide contained in the catalyst and, as a result, to improve heat resistance of the catalyst resulting in improvements in the overall catalytic performance of the catalyst.

In order to achieve the object, the present invention consists of a catalyst for the purification of exhaust gases, comprising a catalyst carrier and a coat layer formed on a surface of the catalyst carrier;

wherein the coat layer contains a catalyst component of a noble metal, active alumina and cerium oxide; and barium oxide is immobilized on particles of cerium oxide.

With the arrangement as described hereinabove, immobilization of barium oxide on the cerium oxide particles prevents the cerium oxide particles from aggregating with each other and suppressing the growth of crystals of cerium oxide upon exposure to heat at high temperatures from exhaust gases, thereby stopping the cerium oxide from causing heat deterioration. The suppression of heat deterioration on the part of the cerium oxide in the catalyst serves as improvements in heat resistance and catalytic performance of the catalyst.

Other objects, features and advantages of the present invention will become apparent in the course of the description of the preferred embodiments, which follows, in conjunction with the accompanying drawings.

DETAILED DESCRIPTION OF THE PREFERRED EMBODIMENTS

The present invention will be described hereinafter more in detail in conjunction with the accompanying drawings.

Figure 1:
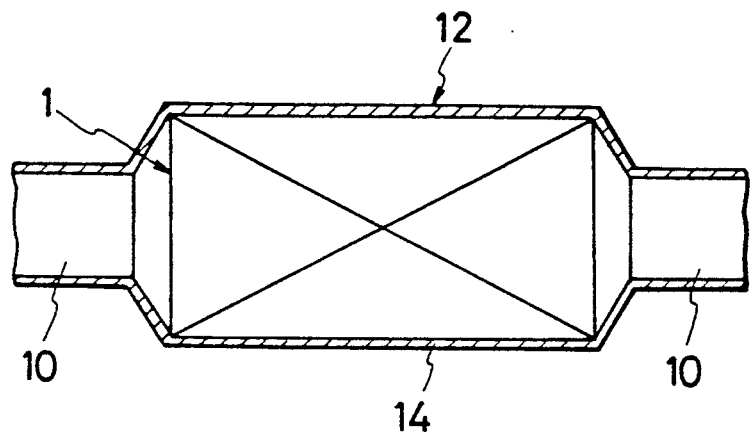
FIG. 1 is a diagrammatic side view in section showing an exhaust system to which the catalyst for the purification of exhaust gases according to an embodiment of the present invention is to be mounted.

As shown in FIG. 1, the automotive vehicle is provided with an exhaust tube 10 for discharging exhaust gases from a combustion engine thereof and the exhaust tube 10 is provided with an exhaust system 12 which comprises a housing 14 connected to the exhaust tube 10 and a catalyst system for purifying exhaust gases disposed within the housing 14 comprising the catalyst 1 according to the present invention.

First Embodiment (FIGS. 2-10)

Description will be made of the specific construction of the catalyst 1 according to the first embodiment of the present invention.

Figure 2:
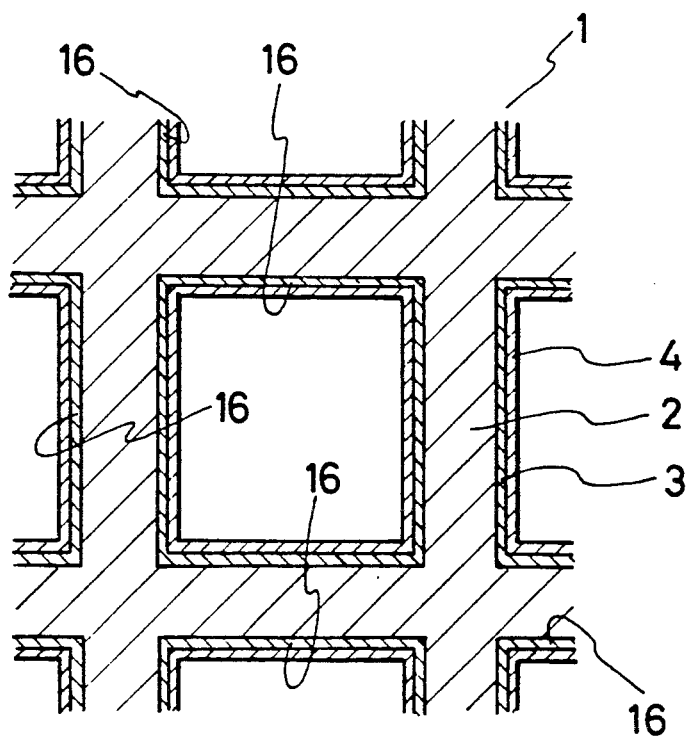
FIG. 2 is a partially enlarged sectional view showing the catalyst for the purification of exhaust gases according to an embodiment of the present invention in a direction normal to the direction in which exhaust gases pass.
Figure 3:
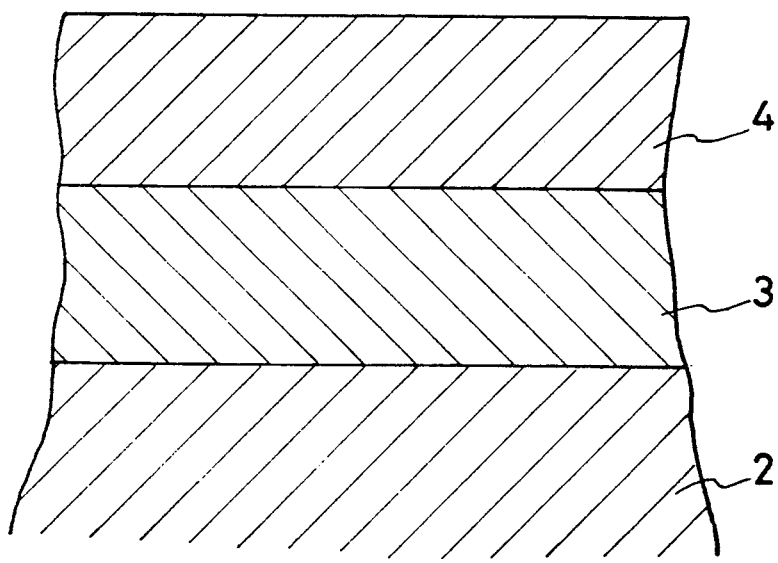
FIG. 3 is an partially enlarged, diagrammatic representation of the catalyst according to an embodiment of the present invention.

As shown in FIGS. 2 and 3, the catalyst 1 comprises a catalyst carrier 2 and a coat comprised of a first coat layer 3 formed on a surface of the catalyst carrier 2 with a second coat layer 4 formed on a surface of the first coat layer 3.

The catalyst carrier 2 may be of a honeycomb structure having a large number of pores 16 extending in the direction parallel to the passage of exhaust gases. The catalyst carrier 2 may include, for example, ceramics such as cordierite, heat-resistant metal, and heat-resistant inorganic fibers.

The first coat layer 3 comprises active alumina as a major component and a catalyst component comprised of a noble metal which may be contained in a dispersed state in the active alumina and which may include, for example, platinum and rhodium.

The second coat layer 4 may comprise cerium oxide as a major component, active alumina and palladium that in turn is immobilized on the cerium oxide. Further, barium oxide is immobilized on the cerium oxide particles and, if desired, lanthanum oxide may be immobilized on the cerium oxide particles, in addition to barium oxide.

The catalyst 1 may be prepared in the following manner.

An appropriate amount of gamma-aluminim oxide ($Al_2O_3$) may be admixed with appropriate amounts of boehmite, water and nitric acids, thereby forming a slurry. The catalyst carrier 2 may then be taken from the slurry and a surplus of the slurry on the surface of the catalyst carrier 2 may be removed by air blowing, thereby giving the catalyst carrier 2 with the slurry coated to the surface thereof as a wash coat. The carrier 2 with the slurry may be dried at elevated temperature for an appropriate period of time and then calcined for an appropriate time period at a temperature higher than the temperature at which the carrier 2 with the slurry has been dried, thereby providing the catalyst carrier 2 with the first coat layer 3 formed on the surface thereof.

The catalyst carrier 2 with the first coat layer 3 may then be impregnated with a solution containing a noble metal compound, thereby depositing the noble metal on the first coat layer 3 as the catalyst component. As the noble metal compound may be appropriately selected a platinum compound and a rhodium compound. As the platinum compound, there may be employed any one that can exhibit the activity of purifying exhaust gases when deposited on the catalyst carrier and may include, for example, $Pt(NO_2)_2(NH_3)_2$, platinum chloride, and so on. The rhodium compound may include, for example, rhodium nitrate and so on, although any rhodium compound may be used for this purpose as long as it can demonstrate the function of removing hazardous components from exhaust gases when deposited on the catalyst carrier. The catalyst carrier 2 with its first coat layer 3 may be dried for an appropriate period of time at elevated temperature and then calcined for an appropriate time period at a temperature higher than the temperature at which the catalyst carrier 2 with the first coat layer 3 has been dried, thereby depositing the noble metal on the first coat layer 3 as the catalyst component. The amount of the alumina in the first coat layer 3 may appropriately range from 2% to 10% by weight with respect to the weight of the catalyst carrier 2 and the amount of the noble metal to be deposited on the first coat layer be above approximately 1.0 grams per liter.

Separately from the catalyst carrier 2 with the first coat layer 3 on which the catalyst component has been deposited, cerium oxide ($CeO_2$) and boehmite are admixed with barium nitrate [$Ba(NO_3)_2$] in appropriate amounts and the mixture may be dried to form a solid mass which in turn may be pulverized into finely divided particles having an average particle size of 100 Angstroms or smaller, preferably ranging from 50 to 100 Angstroms. It is to be noted herein that the barium is immobilized on the particles of the cerium oxide.

The resulting powders may then be admixed with an aqueous of palladium chloride, resulting in a slurry in which the catalyst carrier 2 with the first coat layer 3 may in turn be immersed to thereby form a second coat layer 4 on the surface of the first coat layer 3. After a surplus of the slurry on the surface of the first coat layer 3 has been removed by means of air blowing, the carrier 2 may be dried for an appropriate period of time at elevated temperature and then calcined for an appropriate period of time at a temperature higher than the temperature at which the carrier 2 has been dried, thereby yielding the catalyst carrier 2 with the second coat layer 4 formed on the surface of the first coat layer 3 and converting the immobilized barium into barium oxide. The amount of the wash coat in the second coat layer 4 may vary with respect to the weight of the catalyst carrier 2 and the amount of palladium deposited may be above 0.5 gram per liter. The amount of the barium oxide to be immobilized may vary and range usually from 1% to 15% by weight, preferably from 3% to 13% by weight or from 1% to 10% by weight, with respect to the amount of a total wash coat of the first coat layer 3 and the second coat layer 4, and the amount of the cerium oxide may range usually from 2% to 45% by weight, preferably from 5% to 30% by weight, with respect to the total weight of the first coat layer 3 and the second coat layer 4. The weight ratio of cerium oxide particles to active alumina particles is in the range of from 95 to 5 to 70 to 30, and the cerium oxide particles are contained in the catalyst in an amount ranging from 5% to 30% by weight based on the weight of the catalyst carrier and first coat layer.

For the catalyst 1 as prepared hereinabove, the barium oxide immobilized on the cerium oxide particles can suppress the particles of the cerium oxide from aggregating with each other and enlarging their particles, thereby enabling a prevention of the growth of crystals of the cerium oxide upon exposure to exhaust gases having high temperatures. More specifically, a very large number of pores formed in the cerium oxide crystals can serve as rendering the crystals of the cerium oxide denser and more tight due to the lattice dispersion of barium ions, so that the migration or distortion of the lattice of the cerium oxide is suppressed, thereby preventing the particles of the cerium oxide from growing and enlarging and, consequently, suppressing heat deterioration exerting adverse impacts on the ability of purifying exhaust gases and stabilizing the catalytic activity at low temperatures as well as improving heat resistance of the catalyst.

When rhodium is used and deposited together with platinum in the first coat layer 3, the rhodium having heat resistance may be interposed among the platinum, thereby preventing the platinum from sintering and suppressing heat deterioration of the platinum. As described hereinabove, the deposition of the rhodium can also serve as suppressing heat deterioration of the catalyst itself.

The catalyst according to the present invention will be described more in detail by way of working examples with reference to comparative examples, in conjunction with the accompanying drawings.

First, in order to support the heat resistance of the catalyst according to the present invention, experiments have been made in comparison with catalysts obtained by comparative examples.

EXAMPLE A 100 grams of gamma-aluminium oxide ($Al_2O_3$) and 100 grams of boehmite were admixed with 240 ml of water and 1.00 ml of nitric acid. In the resulting slurry was immersed a catalyst carrier having a honeycomb structure, and the catalyst carrier 2 was taken from the slurry and a surplus of the slurry on the surface of the catalyst carrier 2 was removed by air blowing. The carrier 2 with the slurry was dried at 130° C. for 1 hour and then calcined at 550° C. for 1.5 hours, thereby forming a base coat layer.

The catalyst carrier 2 with the base coat layer was then impregnated with a solution containing a platinum compound as represented by formula: $Pt(NO_2)_2(NH_3)_2$, and rhodium nitrate. The catalyst carrier 2 with its first coat layer 3 was dried at 200° C. for 1 hour and then calcined at 600° C. for 2 hours to thereby form the first coat layer 3. The amount of the alumina (the amount of a wash coat) was varied from 2% to 10% by weight with respect to the weight of the catalyst carrier 2, and the total amount of the noble metal deposited was 1.6 grams per liter with the ratio of platinum to rhodium of 5 to 1.

Separately from the catalyst carrier 2 with the first coat layer 3, 120 grams of cerium oxide and 50 grams of boehmite were admixed with a solution of barium nitrate, and the mixture was dried to form a solid mass which in turn was pulverized into finely divided particles having an average particle size of 100 Angstroms. The barium nitrate was added in such an amount as to account for 5% by weight as barium oxide with respect to the amount of a total wash coat of the first and second coat layers 3 and 4 and the cerium oxide was added in such an amount as to account for 14% by weight with respect to the weight of the catalyst carrier 2 and the first coat layer 3.

The resulting powders were then admixed with a solution of palladium chloride and 240 ml of water, resulting in a slurry in which the catalyst carrier 2 with the first coat layer 3 was in turn immersed to thereby form a second coat layer 4 on the surface of the first coat layer 3. After a surplus of the slurry on the surface of the first coat layer 3 has been removed by means of air blowing, the carrier 2 was dried at 130° C. for 1 hour and then calcined at 550° C. for 1.5 hours, thereby converting the barium immobilized on the particles of the cerium oxide into barium oxide.

The amount of a wash coat of the second coat layer 4 was found to be 14% by weight with respect to the weight of the catalyst carrier 2, and the amount of palladium deposited was 1.0 grams per liter.

EXAMPLE B

The catalyst was prepared in substantially the same manner as in Example A except for the addition of a solution of lanthanum nitrate, together with the barium nitrate, in such an amount as to account for 5% by weight as lanthanum oxide with respect to the weight of a total wash coat of the first and second coat layers 3 and 4.

It is further to be noted that the rate in weight of the cerium oxide contained in the second coat layer 4 to the active alumina contained in the second coat layer 4 may range from approximately 95 to 5 to approximately 70 to 30. If the amount of the cerium oxide would be too much, the catalytic activity may be improved whereas it may become likely to come off and its durability may be reduced. On the other hand, a too small amount of the cerium oxide may reduce the activity of removing CO from exhaust gases.

COMPARATIVE EXAMPLE 1

A mixture of 100 grams of gamma-aluminium oxide and 100 grams of boehmite was admixed with 240 ml of water, 1 ml of nitric acid and 60 grams of cerium oxide, thereby forming a slurry. Into the slurry, there were added a lanthanum nitrate solution and a barium nitrate solution so as to allow a total weight of the wash coat to account for 21% by weight with respect to the weight of the catalyst carrier in a honeycomb structure to thereby form an alumina slurry. In this slurry was immersed the catalyst carrier, and the carrier was taken from the slurry followed by removing a surplus of the slurry by means of air blowing. Then the carrier was dried at 130° C. for 1 hour and calcined at 550° C. for 1.5 hours. Thereafter, the carrier was immersed in a solution containing given concentrations of platinum, rhodium and palladium. The immersed carrier was then dried at 200° C. for 1 hour and calcined at 600° C. for 2 hours, thereby yielding the catalyst containing each 5% by weight as lanthanum oxide and barium oxide with respect to the weight of the wash coat.

COMPARATIVE EXAMPLE 2

A mixture of 100 grams of gamma-aluminium oxide and 100 grams of boehmite was admixed with 240 ml of water and 1 ml of nitric acid, thereby forming a slurry in which the catalyst carrier 2 was immersed, and the carrier was taken from the slurry followed by removing a surplus of the slurry by means of air blowing. Then the carrier was dried at 130° C. for 1 hour and calcined at 550° C. for 1.5 hours. Thereafter, the resulting carrier was immersed in a solution of platinum chloride and rhodium chloride and it was then dried at 200° C. for 1 hour followed by calcining it at 600° C. for 2 hours, thereby forming the first coat layer. The amount of the alumina (the amount of a wash coat) in the first coat layer was found to be 7% by weight based on the weight of the carrier, and the amount of the noble metals deposited was found to be 1.6 grams per liter (a Pt:Rh ratio being 5:1).

Separately, a mixture of 120 grams of cerium oxide and 50 grams of boehmite was admixed with a solution of palladium chloride followed by drying, thereby forming a solid mass which in turn was pulverized into finely divided particles. To the resulting powders was added 240 ml of water to provide a slurry. In this slurry was immersed the first coat layer of the above-prepared carrier, and the carrier was removed from the slurry followed by removing a surplus of the slurry remaining on the surface thereof by means of air blowing. The resulting carrier was dried at 130° C. for 1 hour and then calcined at 550° C. for 1.5 hours, thereby forming the second coat layer on the surface of the first coat layer. The amount of the alumina (the amount of the wash coat) in the second coat layer was found to be 14% by weight based on the weight of the carrier, and the palladium deposited thereon was 1.0 gram per liter.

Figure 4:
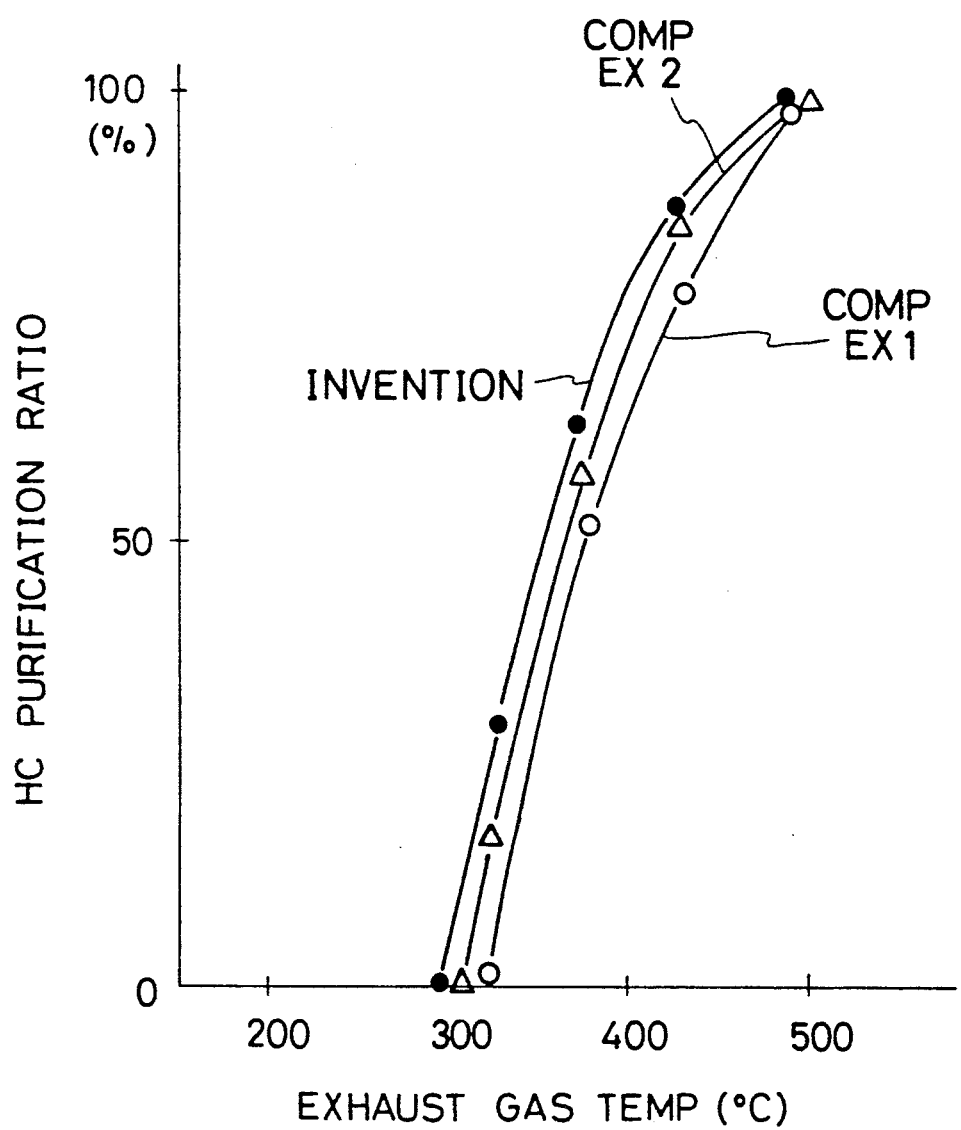
FIG. 4 is a graph showing the characteristic concerning the relationship of the HC purification ratio with the temperature of exhaust gases at the inlet of the catalyst.

The catalyst obtained in Example A and the catalysts obtained in Comparative Examples 1 and 2 were tested for ability of removing hydrocarbons from exhaust gases. In this tests, each of the catalysts was filled in the amount of 24 ml and aged for 50 hours at the air temperature of 900° C. The exhaust gases used for the test were passed through the catalyst at a space velocity of 60,000 hour$^{-1}$ under the air/fuel ratio of 14.7. The HC purification ratios were measured by varying the temperature of the exhaust gases at the inlet portion of the catalyst. The test results are shown in FIG. 4. As is apparent from the test results as shown in FIG. 4, it is found that the catalyst according to the present invention has shown its catalytic activity of purifying the exhaust gases at temperatures lower than the temperatures at which the catalysts according to the comparative examples have shown, thereby suppressing heat deterioration and improving heat resistance.

EXAMPLE 1

The catalyst was prepared in substantially the same manner as in Example A except for the use of a solution containing varying amounts of barium oxide. The tests made in the same manner as described hereinabove have revealed the results of removal of hydrocarbons as shown by line A in FIG. 5 in the same manner as tested hereinabove.

Figure 5:
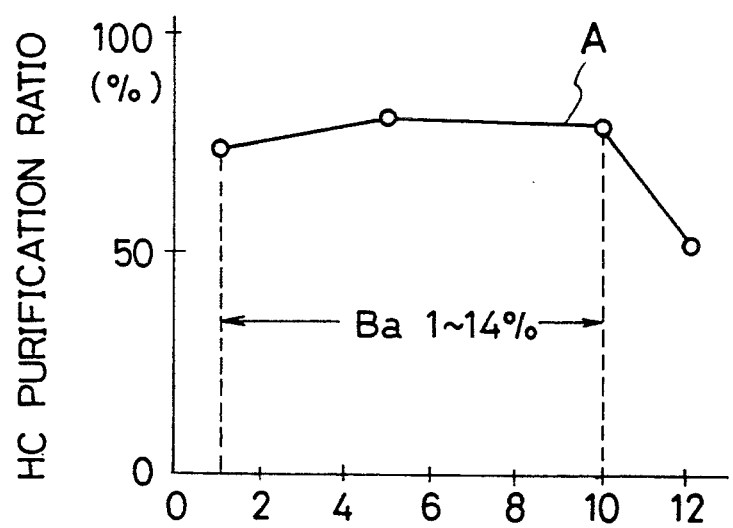
FIG. 5 is a graph showing the characteristic concerning the relationship of the HC purification ratio with varying amounts of barium oxide.
Figure 12:
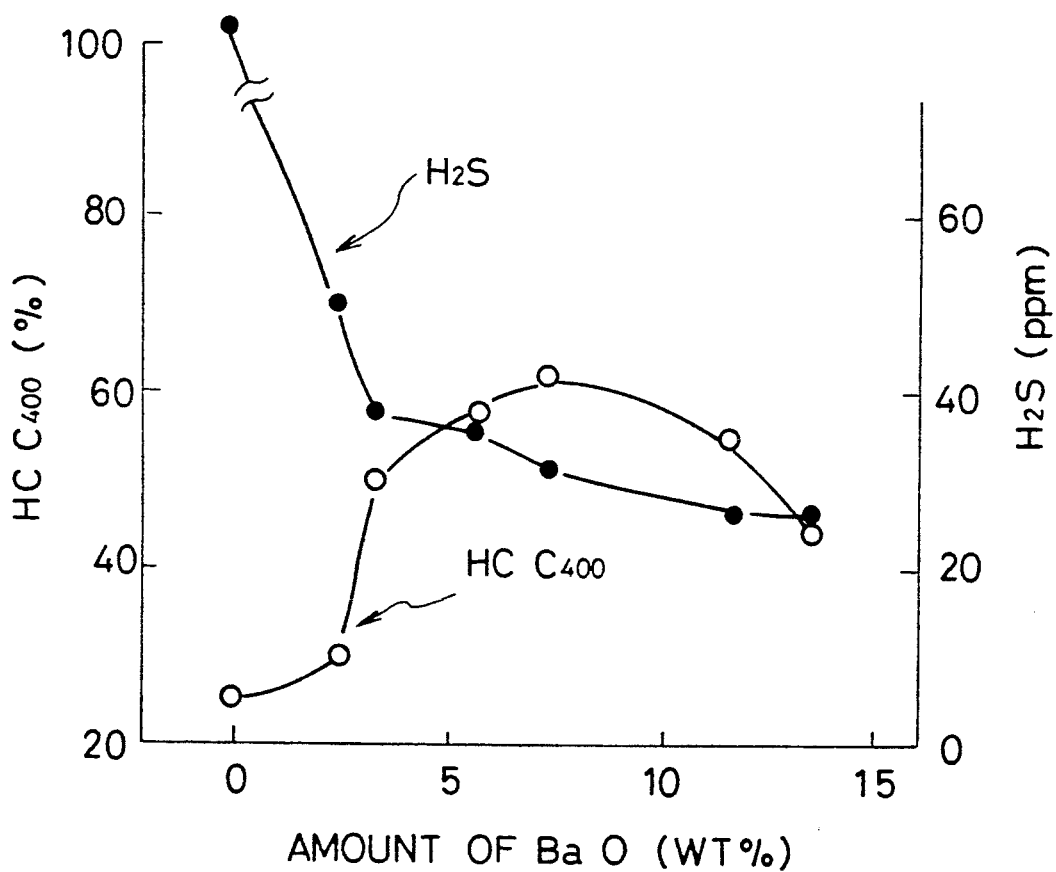
FIG. 12 is a graph showing the relationship of varying amounts of barium oxide with the amounts of hydrogen sulfide formed and with the purification ratios of hydrocarbons (HC) when the catalyst according to another embodiment of the present invention is used.

It is to be noted from the test results as shown in FIG. 5 that, when the barium oxide was used in the amount of 12% by weight, the resulting catalyst has reduced its activity with respect to the HC purification ratio to some extent, however, the HC purification ratio is still extremely higher than the catalyst having no barium oxide immobilized on the cerium oxide particles, as will be shown in FIG. 12.

EXAMPLE 2

Figure 6:
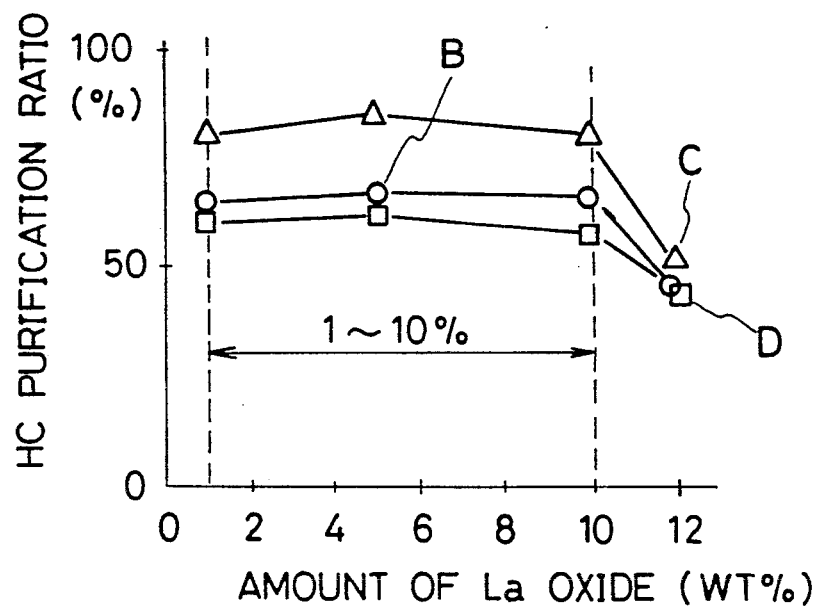
FIG. 6 is a graph showing the characteristic concerning the relationship of the HC purification ratio with varying amounts of lanthanum oxide.

The procedure of Example B above was repeated except for using varying amounts of lanthanum nitrate, thereby producing the catalysts having 1% by weight of the barium oxide, 14% by weight of the cerium oxide, and lanthanum oxide in the amounts ranging from 1% to 10% by weight (1%, 5% and 10% by weight, in this example), as indicated by circles on the line B in FIG. 6.

EXAMPLE 3

The procedure of Example B above was repeated except for using varying amounts of lanthanum nitrate, thereby producing the catalysts having 5% by weight of the barium oxide, 14% by weight of the cerium oxide, and lanthanum oxide in the amounts ranging from 1% to 10% by weight (1%, 5% (Example B) and 10% by weight, in this example), as indicated by triangles on the line C in FIG. 6.

EXAMPLE 4

The procedure of Example B above was repeated except for using varying amounts of lanthanum nitrate, thereby producing the catalysts having 10% by weight of the barium oxide, 14% by weight of the cerium oxide, and lanthanum oxide in the amounts ranging from 1% to 10% by weight (1%, 5% and 10% by weight, in this example), as indicated by squares on the line D in FIG. 6.

COMPARATIVE EXAMPLE 3

The procedure of Example 2 above was repeated except for using the appropriate amount of lanthanum nitrate, thereby producing the catalysts having 1% by weight of the barium oxide, 14% by weight of the cerium oxide, and 12% by weight of lanthanum oxide, as indicated by the circle on the line B in FIG. 6.

COMPARATIVE EXAMPLE 4

The procedure of Example 3 above was repeated except for using the appropriate amount of lanthanum nitrate, thereby producing the catalysts having 5% by weight of the barium oxide, 14% by weight of the cerium oxide, and 12% by weight of lanthanum oxide, as indicated by the triangle on the line C in FIG. 6.

COMPARATIVE EXAMPLE 5

The procedure of Example 4 above was repeated except for using the appropriate amount of lanthanum nitrate, thereby producing the catalysts having 10% by weight of the barium oxide, 14% by weight of the cerium oxide, and 12% by weight of lanthanum oxide, as indicated by the square on the line D in FIG. 6.

The catalysts obtained in Examples 2 to 4 and in Comparative Examples 3 to 5 were tested for their activities for removing hydrocarbon from exhaust gases in the same manner as described hereinabove. The test results are shown in FIG. 6. As it is to be understood from the test results shown in FIG. 6 that the purification activity of the catalysts is reduced when the lanthanum oxide is contained in the amount of 12% by weight, the preferred range of the amount of the lanthanum oxide to be contained in the catalyst may be determined to be from 1% to 10% by weight with respect to the weight of a total wash coat of the first coat layer 3 and the second coat layer 4.

EXAMPLE 5

Figure 7:
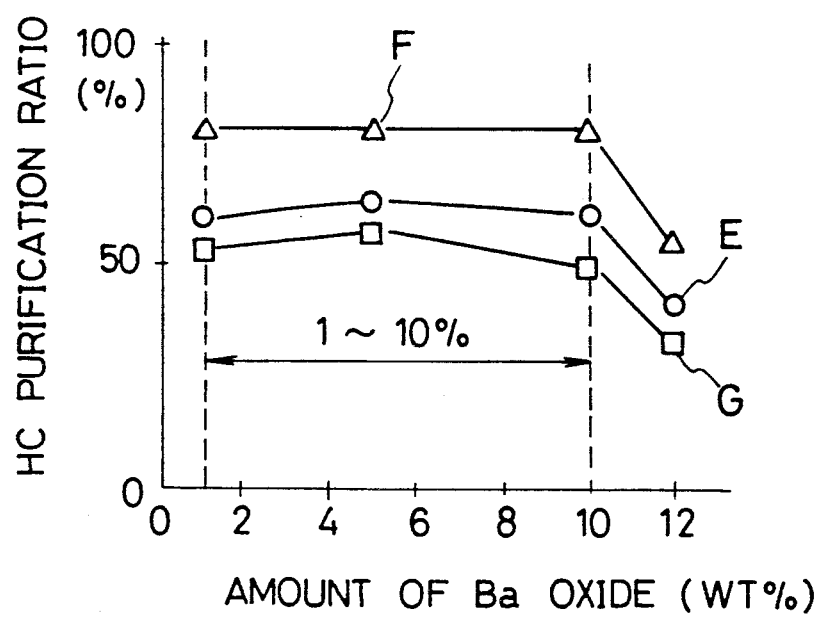
FIG. 7 is a graph showing the characteristic concerning the relationship of the HC purification ratio with varying amounts of barium oxide.

The procedure of Example B above was repeated except for using varying amounts of barium nitrate, thereby producing the catalysts having 1% by weight of the lanthanum oxide, 14% by weight of the cerium oxide, and barium oxide in the amounts ranging from 1% to 10% by weight (1%, 5% and 10% by weight, in this example), as indicated by circles on the line E in FIG. 7.

EXAMPLE 6

The procedure of Example B above was repeated except for using varying amounts of barium nitrate, thereby producing the catalysts having 5% by weight of the lanthanum oxide, 14% by weight of the cerium oxide, and barium oxide in the amounts ranging from 1% to 10% by weight (1%, 5% and 10% by weight, in this example), as indicated by triangles on the line F in FIG. 7.

EXAMPLE 7

The procedure of Example B above was repeated except for using varying amounts of barium nitrate, thereby producing the catalysts having 10% by weight of the lanthanum oxide, 14% by weight of the cerium oxide, and barium oxide in the amounts ranging from 1% to 10% by weight (1%, 5% and 10% by weight, in this example), as indicated by squares on the line G in FIG. 7.

EXAMPLE 8

The procedure of Example 5 above was repeated except for using the appropriate amount of barium nitrate, thereby producing the catalysts having 1% by weight of the lanthanum oxide, 14% by weight of the cerium oxide, and 12% by weight of barium oxide, as indicated by the circle on the line E in FIG. 7.

EXAMPLE 9

The procedure of Example 6 above was repeated except for using the appropriate amount of barium nitrate, thereby producing the catalysts having 5% by weight of the lanthanum oxide, 14% by weight of the cerium oxide, and 12% by weight of barium oxide, as indicated by the triangle on the line F in FIG. 7.

EXAMPLE 10

The procedure of Example 7 above was repeated except for using the appropriate amount of barium nitrate, thereby producing the catalysts having 10% by weight of the lanthanum oxide, 14% by weight of the cerium oxide, and 12% by weight of barium oxide, as indicated by the square on the line G in FIG. 7.

The catalysts obtained in Examples 5 to 10 were tested for their activities for removing hydrocarbon from exhaust gases in the same manner as described hereinabove. The test results are shown in FIG. 7. As it is to be understood from the test results shown in FIG. 7 that the purification activity of the catalysts is reduced to some extent when the barium oxide is contained in the amount of 12% by weight, the preferred range of the amount of the barium oxide to be contained in the catalyst may be determined to be from 1% to 10% by weight with respect to the weight of a total wash coat of the first coat layer 3 and the second coat layer 4, although a greater amount of the barium oxide can provide the HC purification activity higher than the catalyst containing no barium oxide and such an amount of the barium oxide should be noted as still being contained in the scope of the invention.

EXAMPLE 11

Figure 8:
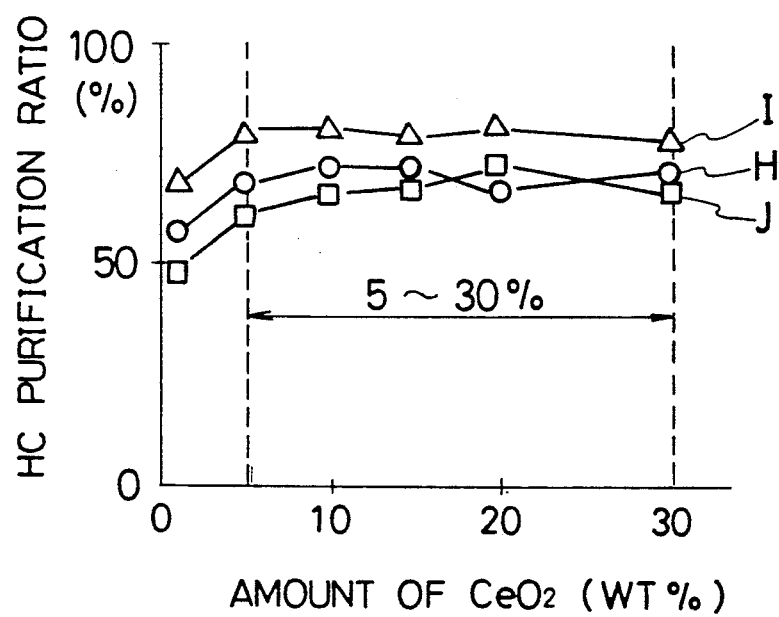
FIG. 8 is a graph showing the characteristic concerning the relationship of the HC purification ratio with varying amounts of cerium oxide.

The procedure of Example B above was repeated except for using varying amounts of cerium oxide, thereby producing the catalysts having 1% by weight each of the barium oxide and the lanthanum oxide and barium oxide in the amounts ranging from 5% to 30% by weight (5%, 10%, 14%, 20% and 30% by weight, in this example), as indicated by circles on the line H in FIG. 8.

EXAMPLE 12

The procedure of Example B above was repeated except for using varying amounts of cerium oxide, thereby producing the catalysts having 5% by weight each of the barium oxide and the lanthanum oxide and cerium oxide in the amounts ranging from 5% to 30% by weight (5%, 10%, 14%, 20% and 30% by weight, in this example), as indicated by triangles on the line I in FIG. 8.

EXAMPLE 13

The procedure of Example B above was repeated except for using varying amounts of cerium oxide, thereby producing the catalysts having 10% by weight each of the barium oxide and the lanthanum oxide and cerium oxide in the amounts ranging from 5% to 30% by weight (5%, 10%, 14%, 20% and 30% by weight, in this example), as indicated by squares on the line J in FIG. 8.

COMPARATIVE EXAMPLE 6

The procedure of Example 8 above was repeated except for using the appropriate cerium oxide, thereby producing the catalyst having 1% by weight of the barium oxide and lanthanum oxide and 1% of cerium oxide, as indicated by circle on the line H in FIG. 8.

COMPARATIVE EXAMPLE 7

The procedure of Example 9 above was repeated except for using the appropriate cerium oxide, thereby producing the catalyst having 5% by weight of the barium oxide and lanthanum oxide and 1% of cerium oxide, as indicated by triangle on the line I in FIG. 8.

COMPARATIVE EXAMPLE 8

The procedure of Example 10 above was repeated except for using the appropriate cerium oxide, thereby producing the catalyst having 10% by weight of the barium oxide and lanthanum oxide and 1% of cerium oxide, as indicated by square on the line J in FIG. 8.

The catalysts obtained in Examples 11 to 13 and in Comparative Examples 6 to 8 were tested for their activities for removing hydrocarbon from exhaust gases in the same manner as described hereinabove. The test results are shown in FIG. 8. As it is to be understood from the test results shown in FIG. 8 that the purification activity of the catalysts is reduced when the cerium oxide is contained in the amount of 1% by weight, the preferred range of the amount of the cerium oxide to be contained in the catalyst may be determined to be preferably from 5% to 30% by weight with respect to the weight of the catalyst carrier and the first coat layer 3, although the amount of the cerium oxide may generally range from 2% to 45% by weight.

Second Embodiment (FIGS. 9-12)

Description will now be made of the second embodiment of the catalyst for purifying exhaust gases according to the present invention in conjunction with FIGS. 9 to 12.

Before entering into description of the specific construction of the second embodiment of the present invention, the mechanism of purifying exhaust gases, particularly hydrogen sulfide, will be described as the background of technology.

The gasoline currently in use as a fuel for automotive vehicles contains the sulfur component which in turn is converted into sulfur dioxide by combustion. Hence, sulfur dioxide is contained in exhaust gases. The sulfur dioxide reacts with hydrogen $H_2$ in the catalyst in the manner as described hereinafter.

$$SO_2 + H_2 \rightarrow H_2S + O_2 \quad (1)$$

As sulfur hydrogen so produced is noxious and extremely malodorous, demands have been made to suppress the generation of sulfur hydrogen from the catalyst.

It is understood that hydrogen sulfide is generated through reduction on an equimolar basis in such an atmosphere that the air/fuel ratio is rich and, however, that no hydrogen sulfide is generated in a concentration higher than the concentration of sulfur dioxide at the inlet of the exhaust system.

The sulfur dioxide is trapped with a metal M in the catalyst and stored in the form of a metal salt $MSO_4$. The stored sulfur dioxide may be freed from the metal salt when the air/fuel ratio is turned from its lean atmosphere to its rich atmosphere and discharged as hydrogen sulfide. As the hydrogen sulfur is temporarily discharged in a large amount, its malodor becomes intolerably remarkable and causes various problems.

More specifically, when exhaust gases are exposed to such an atmosphere in which sulfur dioxide is oxidized, the sulfur dioxide is reacted with the metal in the catalyst and converted into the metal salt, followed by being stored in the catalyst, in the following manner.

$$SO_2 + \tfrac{1}{2}O_2 \rightarrow SO_3 \quad (2)$$

$$SO_3 + MO \rightarrow MSO_4 \quad (3)$$

It is also considered that the metal salt $MSO_4$ may be formed in the following way, too.

$$MO + SO_2 + \tfrac{1}{2}O_2 \rightarrow MSO_4 \quad (4)$$

As the metal M may include, for example, aluminium or cerium, the metal salt $MSO_4$ may be in the form as represented by aluminium sulfite, i.e., $Al_2(SO_4)_3$, or cerium sulfite, i.e., $Ce_2(SO_4)_2$.

The metal salt $MSO_4$ once stored in the catalyst is converted into hydrogen sulfide $H_2S$ in the manner as represented by the formula (5) below, when exhaust gases are turned from oxidation atmosphere to reduction atmosphere, and the hydrogen sulfide so generated is discharged in a large quantity, although temporarily.

$$MSO_4 + 4H_2 \rightarrow MO + H_2S + 3H_2O \quad (5)$$

Figure 9:
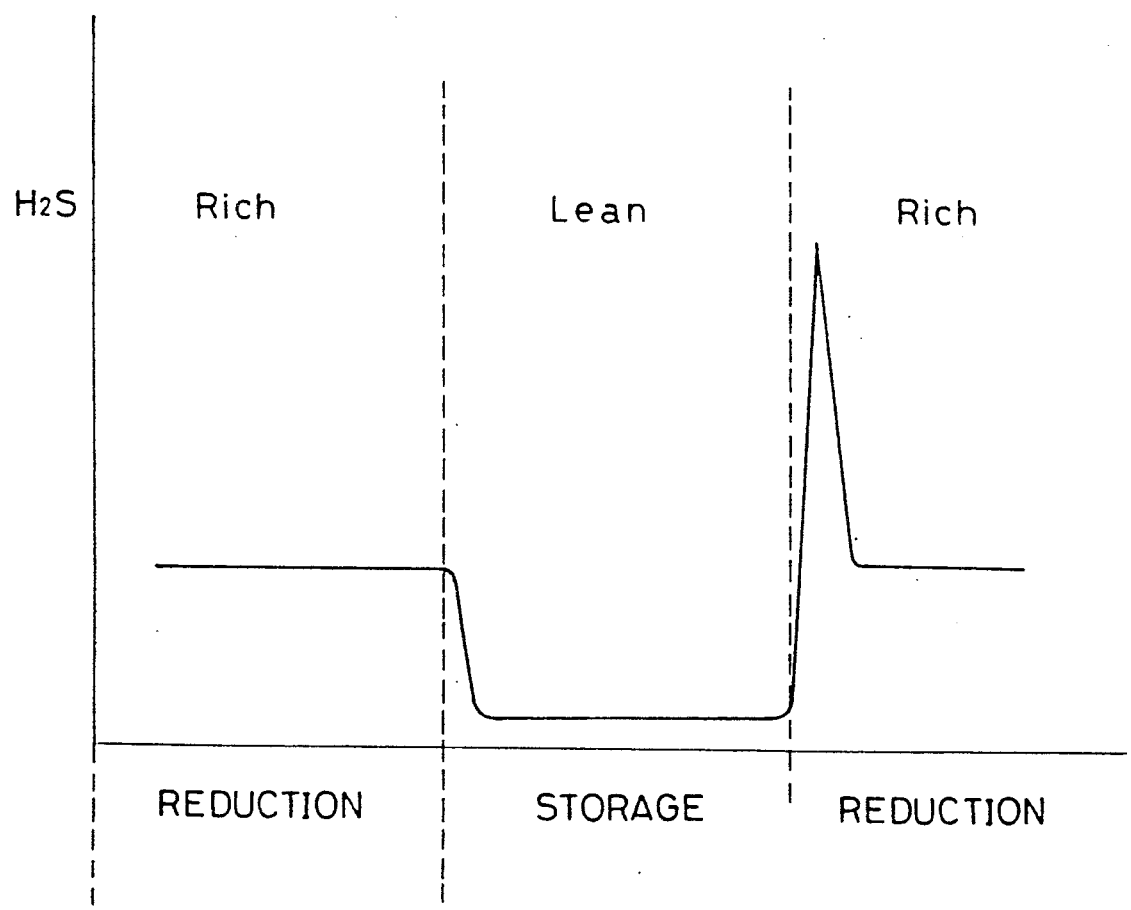
FIG. 9 is a graph showing the relationship of the amount of $H_2S$ formed with air/fuel ratios.

FIG. 9 shows the relationship of the amounts of hydrogen sulfide with changes of exhaust gases in the air/fuel ratios. More specifically, as shown in FIG. 9, in such a state that the automotive vehicle is running in a stationary running mode in the oxidative atmosphere wherein the air/fuel ratio is 16.0, the sulfur dioxide in the exhaust gases is stored in the form of the metal salt $MSO_4$ in the catalyst. And when the stationary running state is changed to an idling state in which the automotive vehicle is suspended, the oxidation atmosphere is also turned into the reduction atmosphere in which the air/fuel ratio is 13.5. In such a state that the air/fuel ratio is turned from its oxidation atmosphere to its reduction atmosphere, the reaction as represented by the formula (5) occurs, thereby generating temporarily a large quantity of hydrogen sulfide together with malodor. When driving the automotive vehicle, such hydrogen sulfide can be generated, for example, when the automotive engine is shifted from its running mode to its idling mode when temporarily suspending the automotive vehicle at crossings or parking, a large quantity of hydrogen sulfide is generated, thereby causing malodor. Therefore, demands for improvements have been made.

Heretofore, measures have been made to suppress the generation of hydrogen sulfide, for example, by controlling the reduction reaction, trapping hydrogen sulfide, and suppressing the formation of sulfate compounds. Among those measures as described hereinabove, a mechanism of hydrogen sulfide being trapped has already been elucidated so that the specific way of suppressing the formation of hydrogen sulfide is adopted by using the technology of trapping hydrogen sulfide. Specifically, sulfur dioxide is reacted with cerium oxide to produced cerium sulfite, $Ce(SO_4)_2$ which in turn is reacted with hydrogen in the reduction atmosphere forming hydrogen sulfide. The hydrogen sulfide is then reacted with a metal oxide, MOx, and trapped in the form of a metal sulfide, MSx, in the catalyst, thereby failing to discharge the hydrogen sulfide toward the outside.

Therefore, the technique of trapping hydrogen sulfide adopted in the measure applied to the automotive vehicles for suppressing the formation of hydrogen sulfide involves using nickel as a component for the catalyst. This technique can trap hydrogen sulfide as nickel sulfide by allowing the hydrogen sulfide to be exposed to the nickel in the presence of cerium oxide in an atmosphere in which the air/fuel ratio is rich, namely, in the reduction atmosphere.

However, this technique using nickel for the method for suppressing the formation of hydrogen sulfide is prohibited particularly in European countries due to its formation of nickel carbonyl causing carcinogenesis. Therefore, strong demands have been made to establish the technique for suppressing the generation of hydrogen sulfide without nickel.

As a result of extensive studies on the method for suppressing hydrogen sulfide using a substituent for nickel, it has now been found that barium can trap hydrogen sulfide. This technique involving the use of barium will now be described more in detail as the second embodiment according to the present invention.

Figure 10:
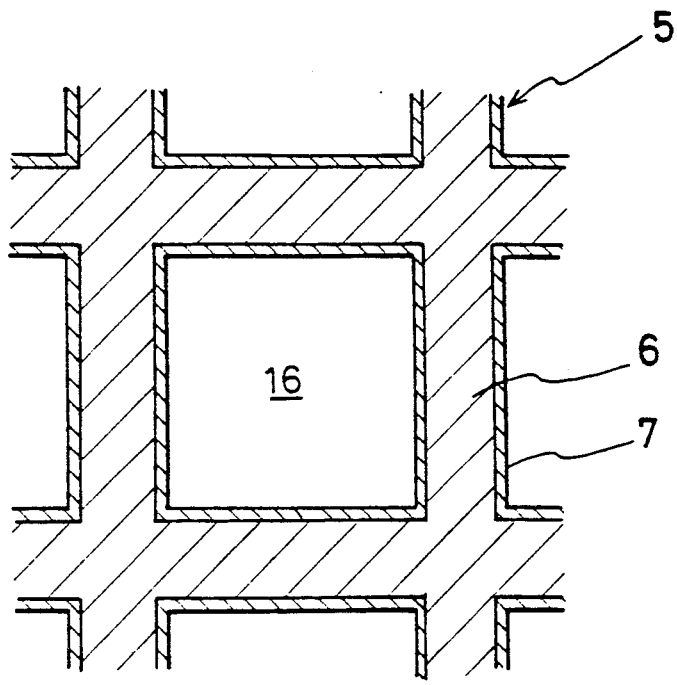
FIG. 10 is a partially enlarged sectional view showing the catalyst for the purification of exhaust gases according to another embodiment of the present invention in a direction normal to the direction in which exhaust gases pass.

As shown in FIG. 10, like the catalyst according to the first embodiment of the present invention, the catalyst 5 according to the second embodiment of the present invention comprises a catalyst carrier 6 having a large number of pores 16 passing through the entire thickness of the carrier and extending in a direction parallel to the direction of passage of exhaust gases. A coat layer 7 comprised of cerium oxide ($CeO_2$) is provided on inner surfaces over the entire length of the fine pores 16 formed in the catalyst carrier 6.

The coat layer 7 is comprised mainly of active alumina $Al_2O_3$ in which a catalyst component consisting of a noble metal and barium oxide are contained. The catalyst component is present in the active alumina in a dispersed state, and at least one of platinum and rhodium is contained as the catalyst component.

The catalysts according to the second embodiment of the present invention will be described more in detail by way of examples in conjunction with the accompanying drawings.

EXAMPLE 11

240 grams of cerium oxide was impregnated with an appropriate amount of barium oxide and the resulting mixture was calcined to thereby immobilize the barium oxide on the cerium oxide. The powders of the cerium oxide with the barium oxide immobilized thereon were then admixed with 240 grams of active alumina, 120 grams of boehmite, 1,000 ml of water and 10.0 ml of nitric acid, and the mixture was homogeneously stirred with a homogenizer, thereby forming a slurry for a wash coat.

Into the slurry was immersed the catalyst carrier 6 of a honeycomb structure, and the catalyst carrier 6 was taken from the slurry followed by removing a surplus of the slurry from the carrier by means of air blowing. The carrier 6 with the slurry adhering thereto was dried at 600° C. for 1 hour and then the carrier 6 was calcined at the temperature of 550° C. and in the oxidation atmosphere, thereby resulting in the formation of a coat layer. This treatment allowed the barium immobilized on the cerium oxide to react with oxygen converting into barium oxide.

The resulting catalyst carrier 6 having the alumina layer with the barium oxide immobilized thereon was then immersed in a solution of appropriate amounts of platinum chloride and rhodium chloride in 170 ml of water, and the immersed carrier was taken from the solution followed by removing a surplus of the solution containing the noble metal compounds by means of air blowing. Thereafter, the resulting catalyst carrier 6 was calcined at 600° C. for 2 hours, thereby forming the coat layer 7.

The resulting coat layer 7 contained the alumina in the amount (as an amount of the wash coat) of 28% by weight with respect to the weight of the catalyst carrier 6, and the cerium oxide was contained in the amount of 40% by weight with respect to the weight of the wash coat while the barium oxide was contained in the amount of 2.5% by weight (3.0 grams per liter) with respect to the weight of the wash coat. The amounts of platinum and rhodium were 1.0 grams per liter and 0.2 gram per liter, respectively.

EXAMPLE 12

The catalyst was prepared in substantially the same manner as in Example 11 except for the use of barium oxide so as to allow the barium oxide to be immobilized on the cerium oxide in the amount of 3.3% by weight with respect to the weight of the wash coat.

EXAMPLE 13

The catalyst was prepared in substantially the same manner as in Example 11 except for the use of barium oxide so as to allow the barium oxide to be immobilized on the cerium oxide in the amount of 5.8% by weight with respect to the weight of the wash coat.

EXAMPLE 14

The catalyst was prepared in substantially the same manner as in Example 11 except for the use of barium oxide so as to allow the barium oxide to be immobilized on the cerium oxide in the amount of 7.5% by weight with respect to the weight of the wash coat.

EXAMPLE 15

The catalyst was prepared in substantially the same manner as in Example 11 except for the use of barium oxide so as to allow the barium oxide to be immobilized on the cerium oxide in the amount of 11.7% by weight with respect to the weight of the wash coat.

EXAMPLE 16

The catalyst was prepared in substantially the same manner as in Example 11 except for the use of barium oxide so as to allow the barium oxide to be immobilized on the cerium oxide in the amount of 13.3% by weight with respect to the weight of the wash coat.

COMPARATIVE EXAMPLE 12

The catalyst was prepared in substantially the same manner as in Example 11 except for no use of barium oxide.

Figure 11:
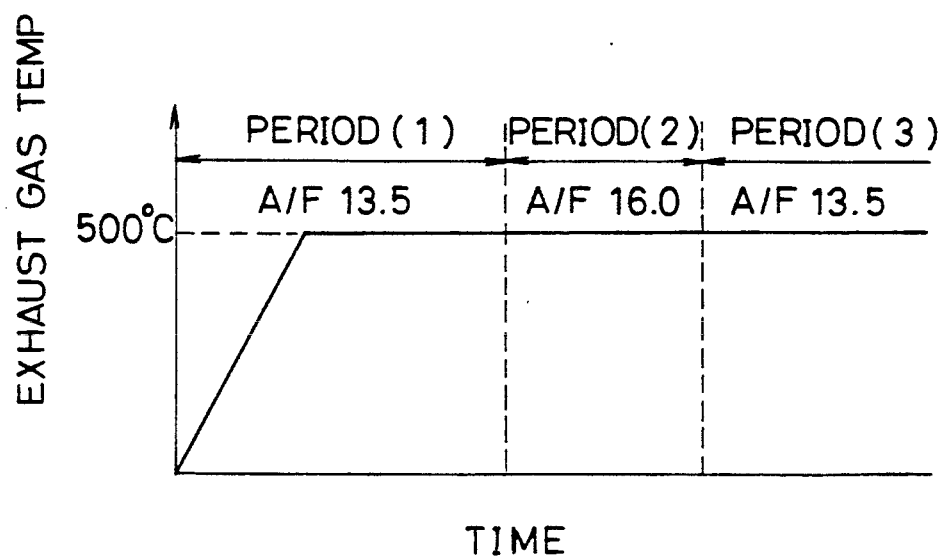
FIG. 11 is a graph showing the state of atmospheres of exhaust gases at varying time periods in testing the activity of removing hydrogen sulfide from the exhaust gases.

The catalysts so prepared were then tested for a variation in the amounts of hydrogen sulfide formed with lapse of the time period, namely, with changes in the air/fuel ratios. As shown in FIG. 11, exhaust gases having the air/fuel ratio of 13.5 started discharging in the period (1) during which the temperature of the exhaust gases were elevated to 500° C. In the period (2), the air/fuel ratio was raised to 16.0 in order to bring the air/fuel ratio into the oxidation atmosphere. Then in the period (3), the air/fuel ratio was lowered to 13.5 and brought into the reduction atmosphere, thereby causing hydrogen sulfide. Then the maximum concentration of hydrogen sulfide discharged in the period (3) was measured.

The catalysts to be tested were aged in the atmosphere having the temperature of 900° C. for 50 hours prior to testing. Then they were tested for its HC purification ratio at the temperature of 400° C. at the inlet portion of the catalyst system in the atmosphere of the air/fuel ratio being 14.5 at the space velocity of 60,000 hour$^{-1}$.

As shown in FIG. 12, it is found that the catalysts prepared in Examples 11 to 16 reduced the amount of hydrogen sulfide formed below approximately 50 ppm, while the catalyst prepared in Comparative Example 12 produced hydrogen sulfide in the amount as high as 100 ppm. In other words, the catalyst according to the present invention reduced the formation of hydrogen sulfide as low as half or less that formed by the catalyst without any barium oxide immobilized. Further, as shown in FIG. 12, the catalyst prepared in Examples 11 to 16 exhibited the ability of purifying exhaust gases, i.e., removing hydrocarbons from exhaust gases, higher than the catalyst prepared in Comparative Example 12 in which no barium oxide was immobilized. The test results as shown in FIG. 12 reveals that the catalyst according to the second embodiment of the present invention may preferably contain the barium oxide in the range generally from 1% to 15% by weight, preferably from 3% to 13% by weight.

It is noted that the mechanism of suppressing the generation of hydrogen sulfide by the addition of the barium oxide proceeds as follows.

On the rich side of the air/fuel ratio, namely, in the reduction atmosphere of exhaust gases, barium oxide is considered to be converted into barium sulfide BaS by reaction with cerium sulfite, $Ce_2(SO_4)_2$, in the following formula (6), thereby forming no hydrogen sulfide.

$$Ce_2(SO_4)_2 + 4BaO + 17H_2 \rightarrow Ce_2O_3 + 4BaS + 17H_2O \qquad (6)$$

The barium sulfide BaS so produced is reacted with oxygen in the following reaction formula (7) to give barium sulfate, producing no cerium sulfite $Ce_2(SO_4)_2$ and suppressing the storage of sulfur dioxide.

$$BaS + 2O_2 \rightarrow BaO + SO_2 \text{ or}$$

$$BaS + 2O_2 \rightarrow BaSO_4 \qquad (7)$$

As described hereinabove, the catalyst 5 according to the second embodiment of the present invention has the coat layer 7 comprising cerium oxide, barium oxide immobilized on the cerium oxide, active alumina, and the catalyst component comprised of platinum and/or rhodium. Hence, the present invention can provide the catalyst by using harmless barium, thereby trapping hazardous sulfur components in the catalyst and suppressing the generation of malodorous hydrogen sulfide, without the use of nickel.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A catalyst for purifying exhaust gases, comprising: a catalyst carrier and a coat layer;
wherein the coat layer contains cerium oxide particles, active alumina particles and a catalyst component of a noble metal, the cerium oxide particles having a ratio by weight of the cerium oxide particles to the active alumina particles ranging from 95 to 5 to 70 to 30; and
barium oxide is immobilized on the cerium oxide particles in an amount ranging from 1% to 15% by weight of the weight of a wash coat of the coat layer.

2. A catalyst as claimed in claim 1, wherein the coat layer is of a one-layer form.

3. A catalyst as claimed in claim 1, wherein the noble metal is platinum and/or rhodium.

4. A catalyst as claimed in claim 1, wherein the amount of the barium oxide is from 3% to 13% by weight.

5. A catalyst as claimed in claim 1, wherein lanthanum oxide in an amount ranging from 1% to 10% by weight of the weight of a wash coat of the coat layer is immobilized on the cerium oxide particles, in addition to the barium oxide.

6. A catalyst as claimed in claim 1, wherein the coat layer comprises a first coat layer formed on a surface of the catalyst carrier and a second coat layer formed on a surface of the second coat layer;
the first coat layer comprises an alumina layer containing the catalyst component of the noble metal; and
the second coat layer comprises the cerium oxide particles, the active alumina particles, and the catalyst component of the noble component, wherein barium oxide is immobilized on the cerium oxide particles.

7. A catalyst as claimed in claim 6, wherein the noble metal contained as the catalyst component in the first coat layer is platinum and/or rhodium; and
the noble metal contained as the catalyst component in the second coat layer is palladium.

8. A catalyst as claimed in claim 6, wherein the barium oxide is immobilized in an amount ranging from 1% to 10% by weight with respect to the weight of a total wash coat of the first coat layer and the second coat layer.

9. A catalyst as claimed in claim 6, wherein the cerium oxide particles are contained in an amount ranging from 2% to 45% by weight based on the weight of the catalyst carrier and the first coat layer.

10. A catalyst as claimed in claim 9, wherein the amount of the cerium oxide particles ranges from 5% to 30% by weight based on the weight of the catalyst carrier and the first coat layer.

11. A catalyst as claimed in claim 6, wherein the cerium oxide particles are contained in an amount ranging from 5% to 30% by weight based on the weight of the catalyst carrier and the first coat layer; and
the cerium oxide particles are contained in a ratio in weight to the active alumina particles ranging from 95 to 5 to 70 to 30.

12. A catalyst as claimed in claim 6, wherein lanthanum oxide is immobilized on the cerium oxide particles, in addition to the barium oxide.

13. A catalyst as claimed in claim 6, wherein lanthanum oxide in an amount ranging from 1% to 10% by weight of the weight of a wash coat of the coat layer is immobilized on the cerium oxide particles in addition to the barium oxide.

* * * * *